US 6,302,345 B1

(12) United States Patent
Hashizume et al.

(10) Patent No.: US 6,302,345 B1
(45) Date of Patent: Oct. 16, 2001

(54) TAPE CASSETTE

(75) Inventors: Kenji Hashizume; Shinichi Sato; Masatoshi Okamura; Hiroshi Kaneda, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/524,429

(22) Filed: Mar. 13, 2000

(30) Foreign Application Priority Data

Mar. 16, 1999 (JP) .................................................. 11-069452

(51) Int. Cl.$^7$ .................................................. G03B 23/02
(52) U.S. Cl. ........................................ 242/347.1; 360/132
(58) Field of Search .......................... 242/347.1; 360/132

(56) References Cited

U.S. PATENT DOCUMENTS

| | | | |
|---|---|---|---|
| 4,466,583 | * 8/1984 | Giannis et al. | 242/347.1 |
| 4,475,700 | * 10/1984 | MacLeod, Jr. et al. | 242/347.1 |
| 4,485,988 | * 12/1984 | Kikuya et al. | 242/347.1 |
| 4,628,389 | * 12/1986 | Tanaka et al. | 242/347.1 |
| 4,858,849 | * 8/1989 | Okamura et al. | 242/347.1 |
| 4,930,821 | * 6/1990 | Jang | 242/347.1 |
| 5,011,096 | * 4/1991 | Nagai et al. | 242/347.1 |
| 5,222,686 | * 6/1993 | Komeiji et al. | 242/347.1 |
| 5,299,755 | * 4/1994 | Fujii | 242/347.1 |
| 5,331,498 | * 7/1994 | Utsumi et al. | 242/347.1 |
| 5,335,876 | * 8/1994 | Yasufuku et al. | 242/347.1 |

FOREIGN PATENT DOCUMENTS

| | | |
|---|---|---|
| 60-20210 | 6/1985 | (JP) . |
| 2675103 | 11/1997 | (JP) . |

* cited by examiner

Primary Examiner—Emmanuel M. Marcelo
(74) Attorney, Agent, or Firm—Darby & Darby

(57) ABSTRACT

A tape cassette is provided with a lock member of a covering member integrally connected with a spring member having high durability and strength as well as improved workability at assembling. The tape cassette includes a covering member rotatably mounted to the housing to cover the tape member placed at a front of the housing, and a lock member provided inside the housing to lock the covering member in a closed state. The lock member is rotated together with the main body and is provided with rotation shafts pivotally supported in the housing, an engagement projection rotating around the axis between the locked position engaging with the covering member and the locked position not engaging with the covering member, biasing members for biasing the engagement projection toward the locked position, and an unlock member for shifting the engagement projection toward an unlocked position. The biasing member is integrally connected with the main body at a remote position from the engagement projection and the unlock member.

6 Claims, 5 Drawing Sheets

TAPE CASSETTE

BACKGROUND OF INVENTION

1. Field of the Invention

This invention relates to a tape cassette having a tape member stored in a housing. More particularly, it relates to a tape cassette having a covering member for protecting a tape member exposed outside the housing and a lock member for preventing the covering member from moving at the time the cassette is not in use.

2. Related Background Art

A conventional tape cassette, such as a VHS video cassette, is provided with a cover lock member for locking the front cover so that the front cover protecting the tape exposed outside of the housing is prevented from moving when the cassette is not in use. For example, Japanese utility model publication No. 60-20210 discloses a cover lock member which is integrally connected with a spring member formed in a curved board shape wherein the cover lock member is biased by the spring member toward the locking position (See FIG. 6 of the publication). However, if the spring member formed in a curved board shape is kept in a unlocked condition (the tape cassette is inserted into a record reproduction device) for a long period of time and thus the spring member is kept biased during that period, the shape of the spring member may be permanently changed. As a result, the locking force generated by deformation of the board shaped spring member is decreased and the sufficient locking force cannot be maintained.

U.S. Pat. No. 4,466,583 discloses a lock member whose structure is basically the same as the lock member disclosed by the Japanese utility model publication No. 60-20210 although projecting direction of the spring member is different (FIGS. 2 to 5). In this case also, it is difficult to maintain the locking force of the lock member for a long period of time. FIGS. 6 to 9 of the above U.S. Patent further discloses a lock member which utilizes the deformation of a plastic member for generating biasing force. Durability of this lock member is superior to the lock member having the above structure. However, if outside force is applied to the locking projection by impact or the like in such direction that the front cover be opened at a time the cassette is not in use, the deformed portion may be easily ruptured by the force transmitted from the projection owing to the proximate position of the deformed portion to the lock projection. If the deformed portion is ruptured, it can no longer function as a lock member.

The lock member disclosed by Japanese patent Publication No. 2675103 utilizes deformation of a deformable portion. The lock member is excellent in durability having a simple structure. However, since the lock member is fixed to the housing by fitting thereto, workability at assembling may be deteriorated (when the fitting is tight) or the locking force may become insufficient (when the fitting is loose) depending on variations of products. As a result, it is difficult to stably maintain the quality of the products.

SUMMARY OF THE INVENTION

It is an object of the present invention to provide a tape cassette whose lock member is integrally connected with a spring member having high durability and strength as well as improved workability at assembling. Also, it is another object of the present invention to provide a tape cassette whose lock member can maintain the locking force for a long period of time.

According to the aspect of the present invention, the tape cassette is provided with housing, a pair of tape reels rotatably stored in the housing and wound by a tape member therearound; a covering member rotatably mounted to the housing so as to cover the tape member drawn from the tape reel and placed in a front of the housing, and a lock member provided in the housing for locking the covering member in such a state that the front of the tape member at a time the tape cassette is closed by the covering member, wherein the lock member is provided with a main body, a rotation shaft rotating together with the main body and pivotally supported in the housing, an engagement projection rotating around the rotation shaft between a locked position where the engagement projection is engaged with the covering member and the unlocked position where the engagement projection is not engaged with the covering member, a biasing member for biasing the engagement projection toward the locked position, and an unlock member for moving the engagement projection to the unlocked position against the biasing force of the biasing member, and the biasing member is integrally connected with the main body at a position separated from the engagement projection and the unlock member.

According to the tape cassette of the present invention, even if force is applied from outside to the engagement projection or the unlock member, excessive force is prevented from applying to the biasing member. This is because the position where the engagement projection and the biasing member are provided, is separated from the position where the biasing member is integrally connected with the main body by a predetermined distance, and resultantly, rupture of the biasing member due to the outside force can be prevented. Further, the lock member is pivotally supported in the housing such that the rotation shaft is rotated between the locked position and the unlocked position. Therefore, workability at assembling can be improved than the tape cassette whose lock member is fitted into the housing. Also, loosening of the fitting which might result in insufficient locking force can be prevented. Thus, a tape cassette having high durability and strength as well as improved workability at assembling can be achieved.

Preferably, the biasing member may be provided with a spring mounted in the vicinity of the rotation shaft and an arm for biasing the engagement projection toward the locked position of the covering member by the biasing force of the spring. In this case, the spring can be integrally connected with the main body in the vicinity of the rotation shaft and the arm is extended from the spring.

Preferably, the spring can be provided at a position projecting from the surface of the main body. By this configuration, the load placed on the spring caused by deformation of the arm at the time of incorporating the lock member into the housing, locking the engagement projection or unlocking the engagement projection can be decreased. As a result, durability of the lock member can be enhanced and the locking force by the spring can be maintained for a long period of time. For example, there may be provided convexities projecting toward a direction opposite from the projecting direction of the engagement projection and the spring may be mounted to these convexities.

Preferably, the arm may be provided at a position closer to the front of the housing than the engagement projection and bent at a predetermined position thereof. Under this configuration, when an optical path hole for detecting the end of the tape member is formed in the vicinity of the opening of the housing through which the engagement projection is engaged with the covering member, obstruction of the optical path due to the arm can be avoided, thereby preventing the arm from hindering the detection of the end of the tape member. The arm may be provided at a side of the main body opposite from the side of the unlock member.

Preferably, the spring may be elastically deformed by being twisted by the arm when the engagement projection is placed at the locked position or rotated toward the unlocked position. Due to the torsional elastic deformation of the spring, the engagement projection may be biased at the locked position, or biased toward the locked position when the engagement projection is placed at an unlocked position.

DETAILED DESCRIPTION OF THE DRAWINGS

Figure 1:
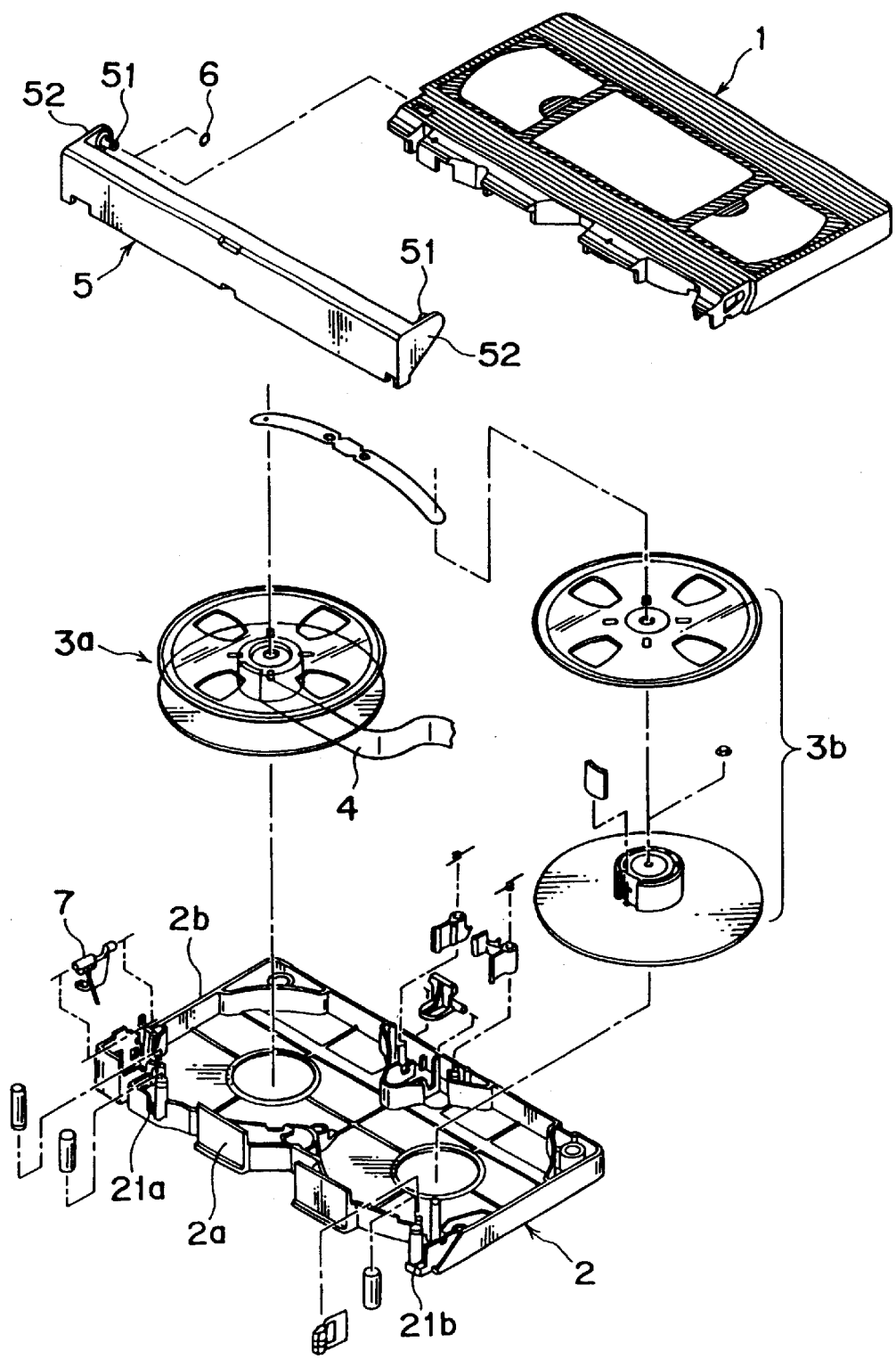
FIG. 1 is a perspective view of a disassembled VHS video cassette (tape cassette) showing an embodiment of the present invention.

Referring now to the drawings, preferred embodiments of the present invention are explained as follows. FIG. 1 is a perspective view of a disassembled VHS video cassette (tape cassette) showing an embodiment of the present invention. As shown in the figure, the VHS video cassette is provided with a housing top half 1, a housing bottom half 2, a pair of tape reels 3a and 3b rotatably stored in the housing top half 1 and the housing bottom half 2 and wound by a tape 4 made of a magnetic recording medium, a covering member 5 rotatably mounted to the housing top half 1 by the shafts 51, 51 formed at the side boards 52, 52 such that the front of the housing is covered by the covering member 5 and continuously biased in a closing direction by the spring 6. The tape 4 is drawn from the tape reel 3a, delivered onto the front face 2a through the opening 21a provided at the front face 2a side of the housing bottom half 2, entering into the housing through the opening 21b and wound by the tape reel 3b. Since the tape 4 is positioned outside the housing between the opening 21a and 21b, it needs to be protected by the covering member 5 at the time the tape is not in use. A lock member 7 is provided at the side of the front face 2a and near the side face 2b of the housing bottom half 2.

Figure 2A:
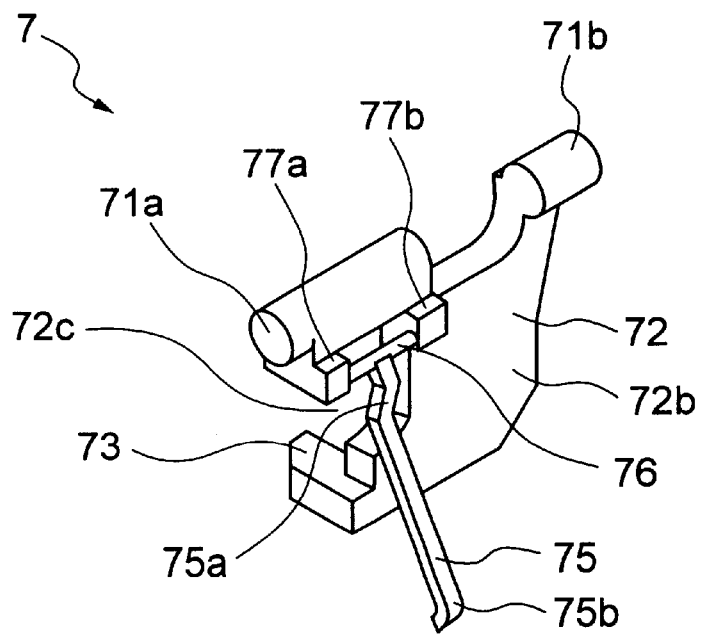
FIG. 2A is a perspective view of the lock member of FIG. 1 viewed from one direction.
Figure 2B:
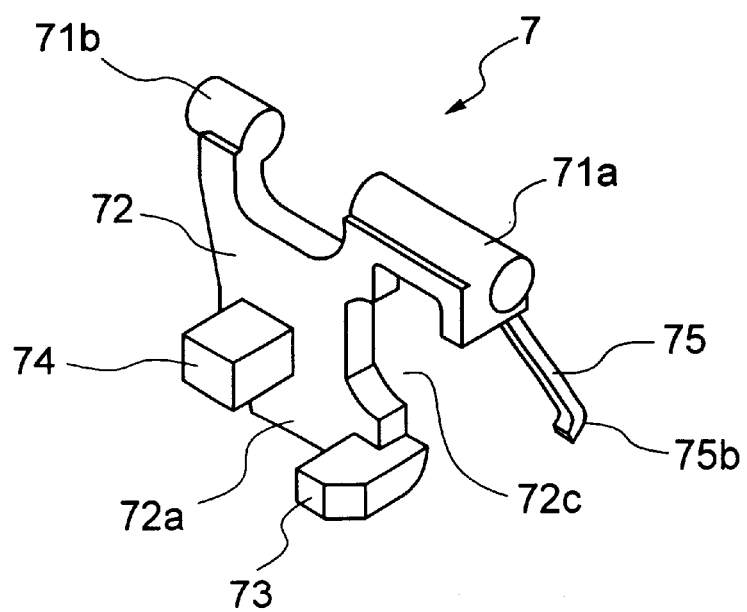
FIG. 2B is a perspective view of the lock member of FIG. 1 viewed from another direction.
Figure 3:
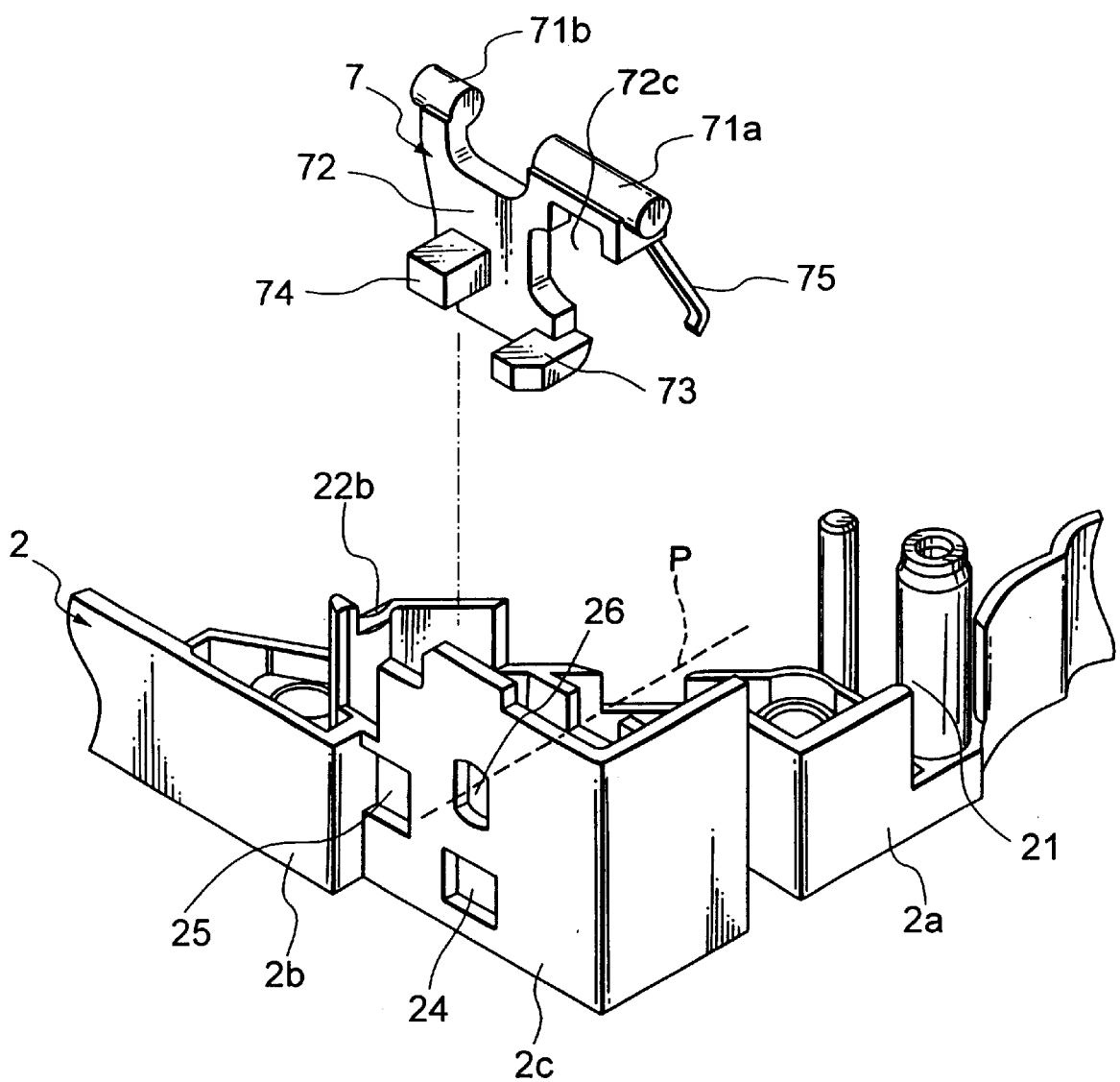
FIG. 3 is a perspective view of the corner portion and the lock member of the housing bottom half shown in FIG. 1.
Figure 4A:
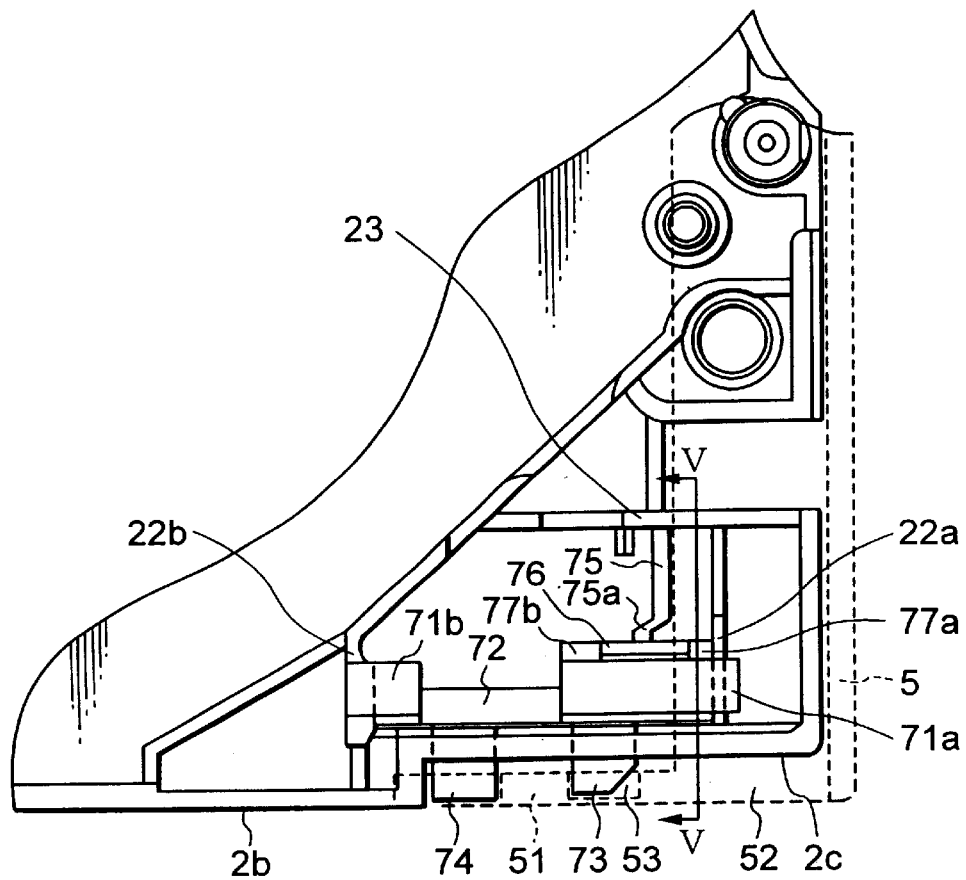
FIG. 4A is a top view of the housing bottom half shown in FIG. 1 wherein a lock member is incorporated.
Figure 4B:
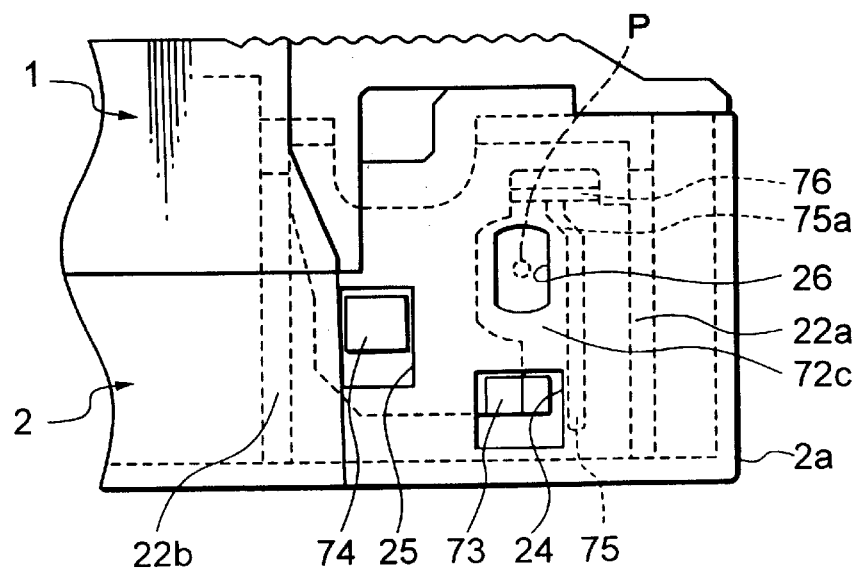
FIG. 4B is a side view of the housing bottom half shown in FIG. 1 wherein a lock member is incorporated.
Figure 5A:
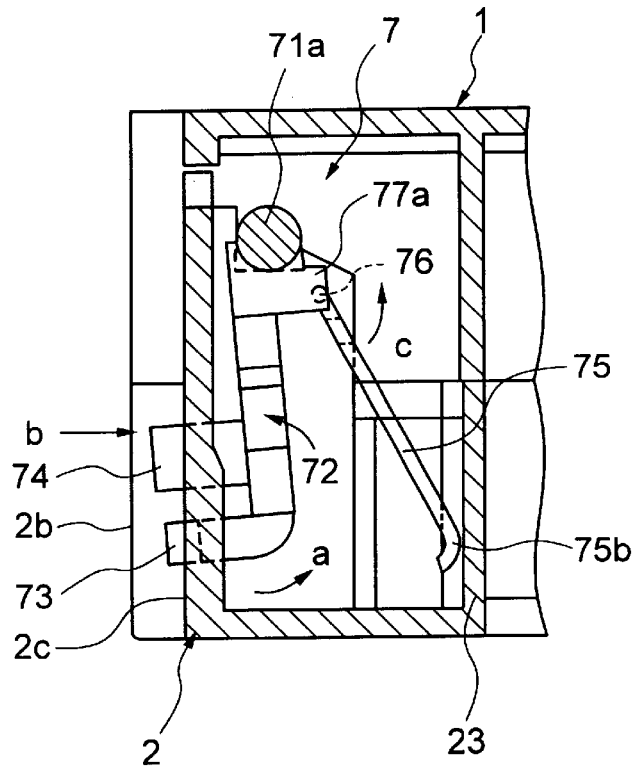
FIG. 5A is a sectional view of the lock member taken along the line V—V.
Figure 5B:
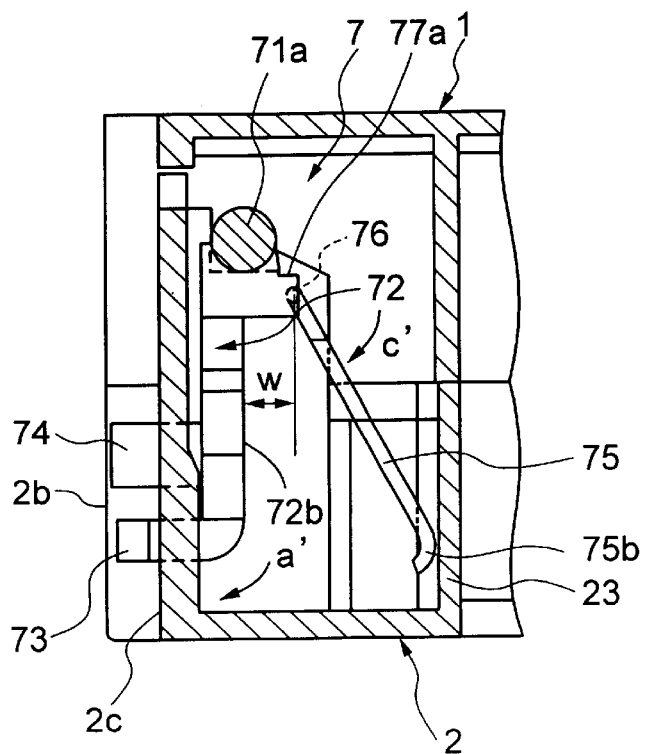
FIG. 5B is a sectional view of the lock member taken along the line V—V.

FIG. 2A is a perspective view of the lock member 7 viewed from one direction. FIG. 2B is a perspective view of the lock member 7 viewed from another direction. FIG. 3 is a perspective view of the corner portion of the housing bottom half 2 and the lock member 7 to be incorporated therein. FIG. 4A is a top view of the housing bottom half 2 wherein the lock member 7 is incorporated. FIG. 4B is a side view of the same housing bottom half. FIG. 5A is a sectional view of the lock member 7 at the time of unlocked state taken along the line V—V of FIG. 4A. FIG. 5B is a sectional view of the lock member at the time of locked state taken along the line V—V of FIG. 4A.

As shown in FIGS. 2A and 2B, the lock member 7 is with a main body 72 in an approximately flat board shape, rotation shafts 71a and 71b formed in a cylindrical shape both integrally provided at a top of the main body 72 and separated to each other by a cutout portion provided therebetween, an engagement projection 73 integrally formed at a bottom of the flat surface 72a of the main body 72, an unlock member 74 integrally formed at a position separate from the engagement projection 73 on the flat surface 72a of the main body 72, a pair of convexities 77a and 77b integrally formed on the flat surface 72b at the opposite side of the flat surface 72a in the vicinity of the rotation shaft 71a, a spring 76 formed in a cylindrical shape with a small diameter integrally provided between the convexities 77a and 77b, and an arm 75 integrally provided at an approximately central position of the spring 76 extending aslant downward from that position.

As shown in FIGS. 2A and 2B, the main body 72 is positioned below the rotation shaft 71a. The middle portion of the main body 72 is cut to create a notch part 72c. The arm 75 is bent to create a bent portion 75a in the vicinity of the spring 76. Under this configuration, an optical path formed to the opening 26 provided as an optical path hole, as hereinafter described, can be secured without interruption of light as shown in FIG. 4B.

As shown in FIG. 3, the lock member 7 is incorporated in the front side corner of the housing bottom half 2. A stepped portion 2c whose surface is lower than the side face 2b is provided at the side face 2b of the housing bottom half 2 such that the side board 52 of the covering member 5 (See FIG. 1) is positioned on the stepped portion 2c. On the surface of the stepped portion 2c, there are provided an opening 24 through which the engagement projection 73 of the lock member 7 engages the covering member 5 and locks the same, an opening 25 through which the unlock member 74 penetrates to contact with the lock releasing member (not shown) provided at the side of the record reproduction apparatus of the video cassette, and an optical path hole 26 for passing the light from the detection sensor to detect the end of the tape.

As shown in FIGS. 3 and 4A, in the vicinity of the corner of the housing bottom half 2, there are provided a support member 22a pivotally supporting the rotation shaft 71a of the lock member 7 and a support member 22b pivotally supporting the rotation shaft 71b. As shown in FIG. 4A and 5, a wall 23 for contacting with the arm 75 of the lock member 7 is formed.

The housing top half 1 and housing bottom half 2 having the above described lock member 7 incorporated therein is explained by referring the FIGS. 4, 5A and 5B. As shown in FIG. 3, the lock member 7 is inserted into the housing bottom half 2 from the top by bending the arm 75 toward the main body 72 side and having the rotation shafts 71a and 71b supported by the support member 22a and 22b of the housing bottom half 2. Then, the top end 75b of the arm 75 contacts with the wall 23 while the arm 75 is twisted toward the rotation direction c' at the spring 76. On the other hand, the lock member 7 is biased in the rotation direction a' around the rotation shafts 71a and 71b by a repulsive force (biasing force) generated by elastic recovering force caused by the torsion of the spring 76. By this movement, the engagement projection 73 and the unlock member 74 project through the openings 24 and 25, respectively. This position of projection is the locked position of the engagement projection 73. As shown in FIGS. 4A and 5A, the engagement projection 73 projecting through the opening 24 of the housing bottom half 2 and positioned at the locked position engages the engagement concavity 53 formed at an inner surface of the side board 52 of the covering member 5. The covering member 5 is locked by the locking member 7 at this locking position so that the covering member 5 is prevented from opening. As a result, the tape placed at the front of the cassette case when the cassette tape is not in use is protected by the covering member 5.

Next, as described above, the tape cassette whose covering member 5 is locked by the lock member 7 is mounted to the record reproduction apparatus. The unlock member 74 is thereby pressed by the lock releasing member (not shown) of the apparatus in the direction of the arrow b in FIG. 5A. Then, the arm 75 of the lock member 7 is rotated in the rotating direction a in FIG. 5A around the rotation shafts 71a and 71b, while the arm 75 is slightly bent and twisted in the rotation direction c against the repulsive pressing force in the rotating direction a' (See FIG. 5B) generated by the spring 76 and the arm 75. By this movement, the engagement projection 73 of the lock member 7 is shifted to the unlocked position and thereby the engagement between the engagement projection 73 and the concavity 53 of the covering member 5 is released. Under this condition, the covering member 5 can be freely rotated inside the apparatus. The recording or reproduction is conducted while the covering member 5 is kept open.

As described above, when the engagement projection 73 is placed at the locked position as shown in FIG. 5B, the arm 75 contacts the wall 23 and biasing force of the lock member 7 toward the locked position is generated by torsion of the spring 76 in the rotation direction c'. Also, as shown in FIG. 5A, if the lock member 7 is rotated in the rotating direction a against the repulsive biasing force toward the locked position, the spring 76 is shifted to the unlocked position while being twisted in the rotation direction c. The biasing force of the spring 76 varies depending on the thickness or length thereof. Therefore, the necessary biasing force can be obtained by adjusting the thickness and/or length of the spring 76. The cross-sectional shape of the spring 76 is not limited to circle but may be ellipse, rectangle, polygon or the like.

The spring 76 is provided at the side of the flat surface 72b formed at the opposite side of the other surface 72a having the engagement projection 73 and unlock member 74 of the main body 72 thereon. The spring 76 is positioned between the convexities 77a and 77b at a distance of w from the flat surface 72b of the main body 72. As a result, the top end 75b of the arm 75 is positioned closer to the wall 23 to that extent. Under this configuration, the load placed on the lock member 7 generated by the torsional deformation of the spring 76 can be decreased and therefore the torsion of the spring at the time of incorporating the lock member 7, locking the covering member 5 and releasing the lock can be decreased. Accordingly, durability of the spring 76 can be enhanced and the locking force generated by the spring 76 can be sufficiently maintained for a long period of time.

Further, the spring 76 of the lock member 7 is provided in a horizontal direction at the side of the main body 72 opposite from the side of the engagement projection 73 and unlock member 74. For example, as shown in FIGS. 6 to 9 of U.S. Pat. No. 4,466,583, a spring may be provided at a position between an engagement projection and an unlock member. Under this configuration, however, if due to some outside impacts force is applied to the covering member in such direction that the covering member is opened when the tape cassette is not in use, an excessively strong force might be applied to the spring provided in the vicinity of an engagement projection, causing a destructive damage to the spring and the like. Contrary, the spring 76 of the lock member 7 according to the embodiment of the present invention is provided at a remote position from the engagement projection 73 and/or unlock member 74. Therefore, even if a unexpectedly strong force is applied to the engagement projection and/or lock releasing portion 74, that force is not directly transmitted to the spring portion 76, causing no destructive damage to the spring 76.

Further, under the configuration of the lock member shown by U.S. Pat. No. 4,466,583, the molding mold for producing the arm is provided near the engagement projection and unlocked member. As a result, the strength of the mold inevitably becomes insufficient. However, according to the embodiment of the present invention, the spring 76 and the arm 75 are provided at a remote position from the engagement projection 73 and the unlock member 74. Therefore, strength of the metal mold can be sufficiently maintained.

Further, the lock member 7 is pivotally supported by the supporting members 22a and 22b provided inside the housing bottom half 2 such that the rotation shafts 71a and 71b are rotated between the locked position and the unlocked position. As a result, compared to the conventional tape cassette whose lock member is fitted in the housing bottom half, workability of assembling the tape cassette is significantly improved. Also, since the lock member is not fitted in the housing bottom half, weakening of the locking force of the lock member which might be caused by loosening the fitting between the lock member and the housing bottom half does not occur. As described above, according to the configuration of the embodiment of the present invention, a tape cassette having high durability and strength as well as excellent workability at assembling can be achieved.

Further, there is provided a notch part 72c below the rotation shaft 71a of the lock member 7 as well as a bent portion 75a at a middle position of the arm 75 of the lock member 7. Under this configuration, the optical path hole 26 for detecting the end of the tape is not obstructed as shown in FIG. 4B. Therefore, even though the arm 75 is mounted to the lock member 7 according to the embodiment of the present invention, the optical path P (see FIGS. 3 and 4B) for detection can be secured. When the tape cassette is inserted into the record reproduction apparatus, light source is inserted into the tape cassette. The light from the light source is transmitted to the light-transmittable tape at the end of the tape and pass through the optical path hole 26 to be incident on the sensor provided outside of the tape cassette and detect the end of the tape of the tape cassette. Although the spring 76 and the arm 75 are provided at the frontward side 2a of the housing than the engagement projection 73, they may be provided at backward position of the unlock member 74. The lock member 7 according to the embodiment of the present invention may be integrally produced by molding using plastic material.

Foregoing is the explanation of the tape cassette according to the embodiments of the present invention. However, the present invention is not limited to these embodiments but may include various modifications within the technical concept of the present invention. For example, it does not need to be a VHS video cassette but may be a tape cassette wherein a covering member is locked by a lock member. Also, the tape member does not need to be a magnetic recording medium but may be a cleaning tape or the like.

According to the present invention, a tape cassette whose lock member is integrally connected to the spring body having high durability and strength as well as improved workability at assembling can be achieved. Further, the locking force generated by the lock member can be maintained for a long period of time.

What is claimed is:

1. A tape cassette comprising:

a housing;

a pair of tape reels rotatably stored in the housing and wound by a tape member therearound;

a covering member rotatably mounted to the housing and for covering the tape member drawn from the tape reel and placed in a front of the housing; and a lock member provided in the housing for locking the covering member in such a state that the front of the tape cassette is closed by the covering member, the lock member comprising:

a main body;

a rotation shaft rotating together with the main body and pivotally supported in the housing;

an engagement projection rotating around the rotation shaft between a locked position where the engagement projection is engaged with the covering member and an unlocked position where the engagement projection is not engaged with the covering member;

a biasing member for biasing the engagement projection toward the locked position; and an unlock member for moving the engagement projection toward the unlocked position against biasing force of the biasing member, wherein the biasing member is integrally connected with the main body at a position separated from the engagement projection and the unlock member, wherein said biasing member comprises a spring member provided in the vicinity of the rotation shaft, and an arm member for biasing the engagement projection toward the locked position by the biasing force of the spring.

2. A tape cassette as described in claim 1, wherein said spring member is provided at a position projecting from a surface of the main body.

3. A tape cassette as described in claim 1, wherein said arm member is provided at a position closer to a front of the housing than the engagement projection and bent at a predetermined position thereof.

4. A tape cassette as described in claim 3, wherein an optical path hole is provided i n the vicinity of an opening provided through which the engagement projection is engaged with the covering member and a part of the optical path for detecting an end of the tape member is formed on a line connecting the optical path hole and the bent portion of the arm member.

5. A tape cassette as described in claim 1, wherein said arm is provided at a position closer to a back of the housing than the unlock member.

6. A tape cassette as described in claim 1, wherein said spring member is formed in a cylindrical shape with a diameter smaller than that of the rotation shaft, said arm member is extended from the spring member formed, and the biasing force is generated by the spring member when the cylindrical spring member is twisted by an existence of the arm member.

* * * * *